Nov. 1, 1960     E. I. WHITE     2,958,130
DENTAL APPLIANCE
Filed Nov. 3, 1958     3 Sheets-Sheet 2
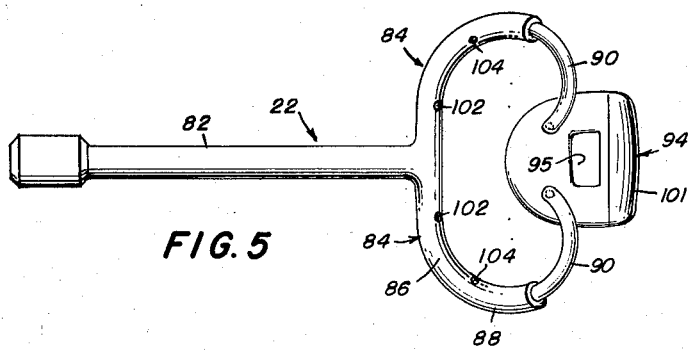
FIG. 5
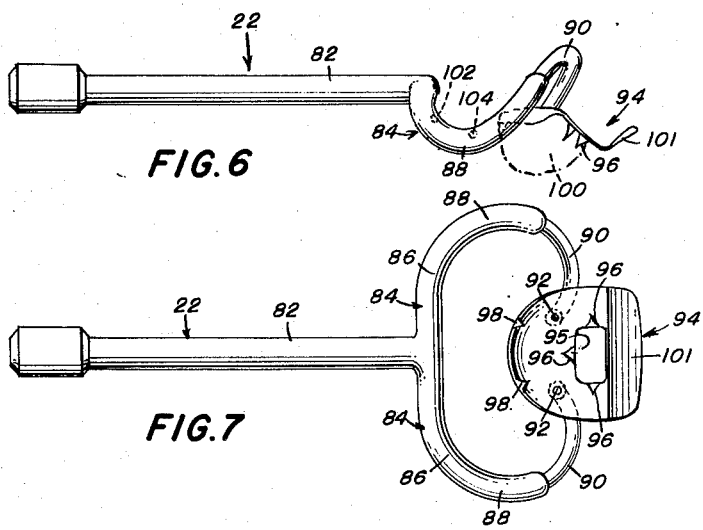
FIG. 6
FIG. 7
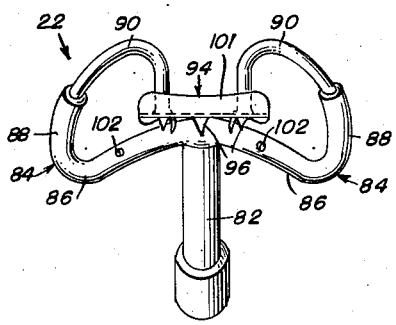
FIG. 8
INVENTOR
ERNEST I. WHITE
BY *Leech & Radue*
ATTORNEYS Nov. 1, 1960       E. I. WHITE       2,958,130
DENTAL APPLIANCE Filed Nov. 3, 1958       3 Sheets-Sheet 3

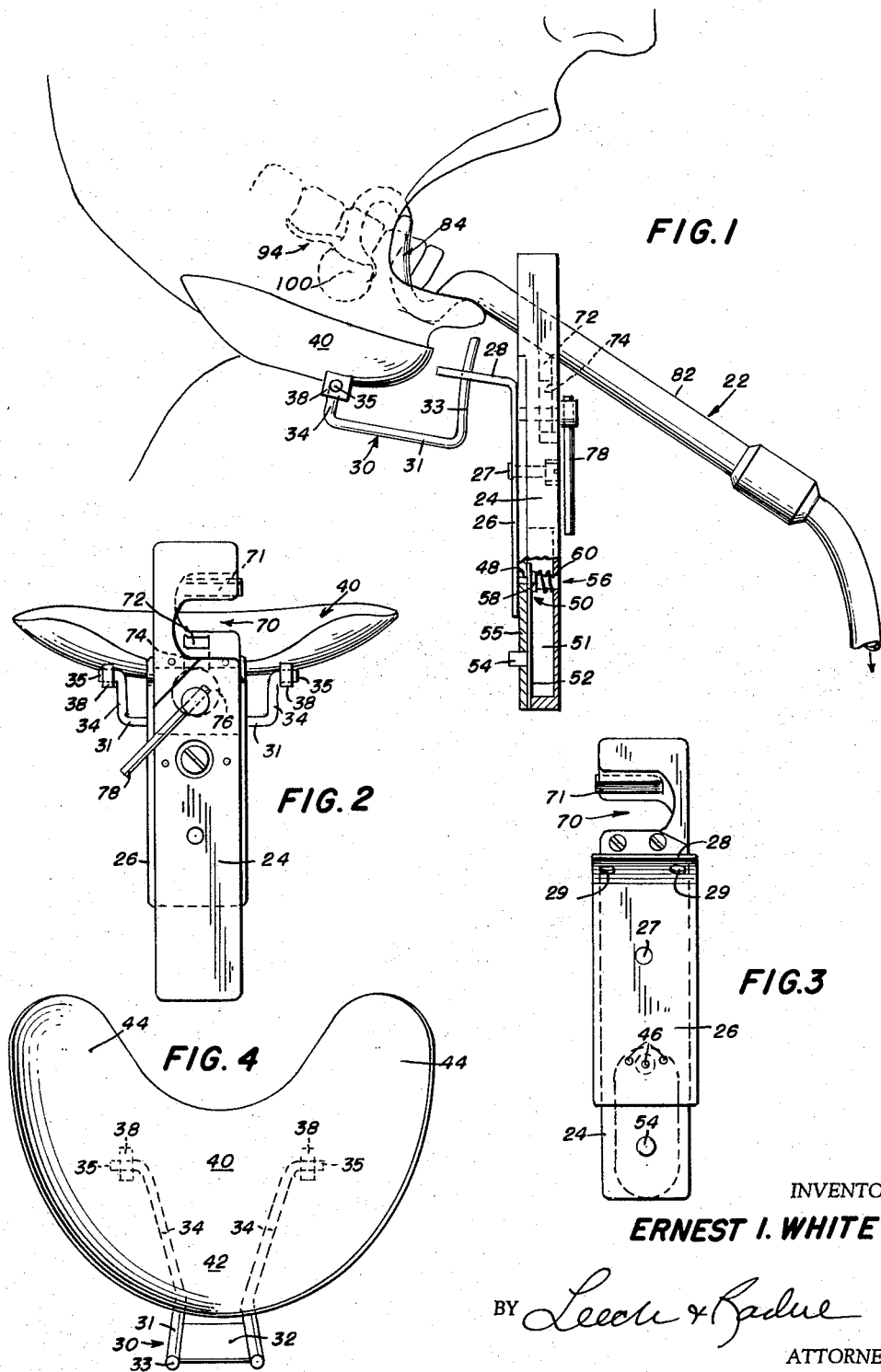

INVENTOR
ERNEST I. WHITE

BY *Leech & Radue*

ATTORNEYS

United States Patent Office 2,958,130
Patented Nov. 1, 1960

2,958,130

DENTAL APPLIANCE

Ernest I. White, 109 Sevier Ave., Greeneville, Tenn.

Filed Nov. 3, 1958, Ser. No. 771,633

11 Claims. (Cl. 32—33)

This invention relates to dental appliances and more particularly to an assemblage adapted to fit within the mouth of the patient for the purpose of removing saliva and retracting the tongue and mouth portions as an aid in dental work.

Until recent years most dental equipment included motor units which operated drills and other related equipment in the 4,000 to 5,000 r.p.m. range. Today with modern high speed equipment speeds of 20,000 to 30,000 r.p.m. are used. In such high speed work much smaller cutting tools are used with a very light touch and with a jet of water directed on the area on which the work is being done. It is contemplated that in the future dentists will use an anesthetic and many times will work on a quadrant of the mouth at a single sitting. This high speed technique has made it imperative that more efficient means be provided for: (1) retracting the cheek, tongue and lips for a better view of the field of operation; (2) efficiently removing the fluids from all parts of the mouth; and (3) protecting the soft tissues of the mouth from possible injury.

In view of the above, it is an object of this invention to provide a dental appliance which will efficiently retract the cheek, tongue and lips of the patient, effectively remove fluid from all parts of the mouth, and protect the soft tissues of the mouth from injury.

It is another object of this invention to provide a holder for the dental appliance above which is fully adjustable in all respects.

Another object of this invention is to provide an attachment for the basic dental appliance as referred to above, which will make it possible to work effectively on the teeth in the upper portion of the mouth.

The word "aspitratcor" is used hereinafter to designate units which remove fluids from the mouth and also act to retract the cheek, tongue, and lips singly or in combination.

The above and other objects of this invention will become more apparent when taken in conjunction with the following detailed description and drawings, showing by way of example a preferred embodiment of this invention and wherein:

Fig. 1 is a side elevation showing the lower anterior aspitratcor unit mounted in the holder and properly positioned in the patient's oral cavity;

Fig. 2 is a front view of the holder;

Fig. 3 is a rear view of the holder with the chin rest omitted;

Fig. 4 is a top plan of the chin rest assembly;

Fig. 5 is a top plan view of the lower anterior aspitractor unit;

Fig. 6 is a side elevational view of the lower anterior aspitractor unit;

Fig. 7 is a bottom plan view of the lower anterior aspitractor unit;

Fig. 8 is an end elevational view of the lower anterior aspitractor unit;

Figure 9:
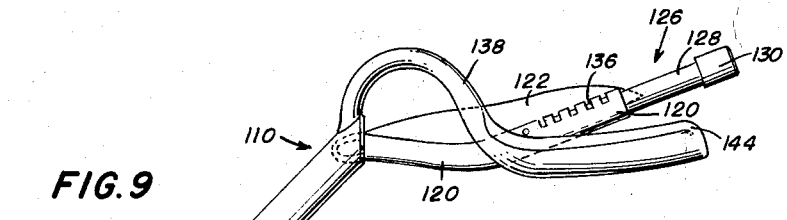
Fig. 9 is a side elevational view of the lower posterior aspitractor unit.

As illustrated in Fig. 1, the dental appliance of this invention comprises a holder 20 suitably supporting an aspitractor unit 22, part of which is shown in dotted lines, positioned for use in the patient's oral cavity.

Plate 26 has a right angle bend adjacent its upper end portion forming a generally horizontal rearwardly extending flange 28 having a pair of spaced holes 29 therein.

A chin rest yoke 30 is adjustably carried by the flange 28. As best illustrated in Figs. 1, 2 and 4 the yoke 30 comprises a pair of identical somewhat U-shaped arms 31 held in spaced relation by means of connecting cross piece 32. The outer end portions 34 of one end of each arm diverge and have outwardly directed portions 35 which fit in apertured lugs 38 on the bottom of the chin rest 40. The arm portions 33 on the opposite end of the yoke 30 fit through holes 29 in plate flange 28. Both pairs of ends of the yoke are spring-like so that they may be pressed toward each other in assembling the yoke with the chin rest 40 and the flange 28. The springiness of the arm portions 33 is sufficient to cause them to frictionally engage the wall portions of the holes 29 to securely hold the assembly in place.

The chin rest 40 is pivotally held by yoke 30 through outwardly directed portions 35 carried in apertured lugs 38. The chin rest comprises a concave forward portion 42 with rearwardly diverging wing portions 44.

The angular position of plate 26 is maintained by means of a pin lock arrangement. As shown in Figs. 1 and 3, plate 26 has three holes 46 in its lower section. Any one of these holes may be selectively engaged by lock pin 48 of the lock pin assembly 50. This assembly generally fits in a cavity 51 in the holder body 24 and comprises a spring lever 52 carrying an actuating button 54 which extends through and beyond the back side 55 of the holder. A pin 56 having an annular shoulder portion 58 with a cylindrical portion 60 extending outwardly from one side and a cylindrical lock pin 48 extending outwardly from the opposite side is carried by the free end of spring lever 52. The lock pin 48 extends through an aperture in the end portion of the spring lever 52 so that shoulder 58 will bear against the face of the spring lever. The cylindrical portion 60 is surrounded by a coil spring 61 which bears against the shoulder 58 to force the lock pin 48 into engagement with registering hole 46 in plate 26. There is an opening in the front side of the body 24 to allow the cylindrical portion 60 to slide in when the button 54 is pushed to release the lock pin 48 from the hole 46.

The upper end portion of the body 24 has a slanting transverse slot 70 extending fore and aft with the high side facing the chin and jaw support members. The tubular portion of the aspitractor unit is positioned in this slot and held in locked position by suitable means. As shown, this locking means comprises a generally rectangular lock member 72 slidably carried in vertical hole 74 and having an upper face with a slope conforming to that of the slot 70. This upper face may be serrated transversely to aid in the gripping action. A rubber gripping member 71 may be positioned in the face confronting lock member 72 to aid in holding the tubular element in place. The lower face of the lock member 72 is engaged and actuated by an eccentrically mounted cam 76 rotated by lever 78.

As best shown in Figs. 5 to 8 the lower anterior aspitractor unit 20 comprises a primary suction tube 82 whose forward end merges into a bifurcated portion from which extend suction tubes 84, 84. Each suction tube has a portion 86 extending laterally outward at almost a right angle to the tube 82 and then a forwardly directed curving portion 88 forming a downwardly extending and forwardly directed U-shaped portion generally parallel to the tube 82. Forwardly curving portion 88 then turns inwardly to form a generally inverted U-shaped portion 90 terminating at a point forward and generally level with tube 82. The open ends 92 of the suction tubes are secured to a combined cotton roll holder and tongue retractor 94. This member 94 has a centrally positioned aperture 95 surrounded on the rear and two adjacent sides by downwardly extending prongs 96. In addition several prongs 98 extend downwardly from the rear portion of the member 94. These prongs 96 and 98 cooperate to engage and retain a cotton roll 100, shown in dotted lines. The forward end portion 101 of member 94 is curved upwardly to aid in tongue retraction.

Each suction tube 84 has an opening 102 in the portion 86 and a hole 104 in portion 88. In addition, as previously mentioned, the ends of the suction tubes 84 are open. Holes 102 and 104, together with the opening 92 at the end of each suction tube 84 act to remove fluid from various portions of the mouth.

The rearward end of the main tube 82 terminates in an enlarged portion to which any suitable aspirating or suction device may be attached.

As indicated in Fig. 1, the lower anterior aspitractor unit 22 is held in the patient's mouth by means of holder 20. Tube 82 is passed through slot 70 and held in position by lock member 72 actuated by cam 76 which is in turn rotated by lever 78. The unit 22 is so positioned that the cotton roll holder and tongue retractor is placed just behind the lower anterior teeth. The curved portion 90 of each side of the suction tube 84 fits over the lower anterior teeth while the inward portion 88 fits down between the adjacent buccal and labial surfaces of the mouth. Such an arrangement makes it possible to keep the lower lingual portion of the mouth, and the buccal and labial surfaces free from fluid. It also serves to retract the tongue and hold the lower lip portion of the patient's mouth in retracted position to afford a clear working area for the dentist. Once the holder and aspitractor are properly positioned they will remain in position, thus freeing both of the dentist's hands.

Figure 10:
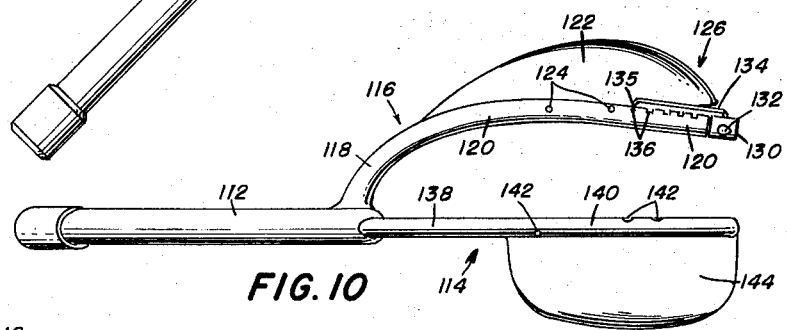
Fig. 10 is a top plan view of the lower posterior aspitractor unit.
Figure 11:
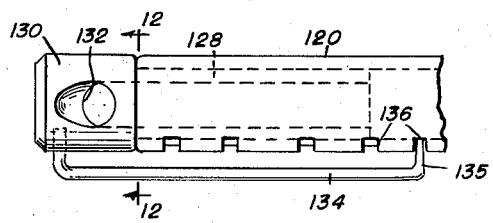
Fig. 11 is an enlarged top plan view of the upper molar suction and retractor unit support which is slidably carried by the lower posterior aspitractor unit.
Figure 12:
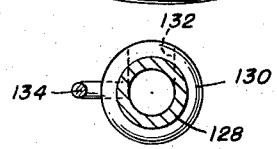
Fig. 12 is a cross sectional view taken along line 12—12 of Fig. 11.

The lower posterior aspirator unit 110, as illustrated in Figs. 9, 10 and 11, is adapted primarily for use when working in the bicuspid and molar region but may be so positioned for work from median line to and including the third molar on its respective side when desirable. The lower posterior aspitractor functions to remove fluid from the lingual and buccal sides of the lower posterior teeth and also to retract the cheek and the tongue in this area.

The lower posterior aspitractor unit 110 comprises a primary suction tube 112, the forward end of which is bifurcated to form lingual and buccal suction and retracting arms 114 and 116 respectively. The buccal suction and retracting arm 116 comprises a curved tubular portion 118 extending laterally outward from the tube 112 and thence into a forwardly directed portion 120 generally parallel to the longitudinal axis of the tube 112, the outer end part of portion 120 turning upwardly a slight amount. A cheek retracting flange 122 extends laterally outward from the curved tubular portion 118 and the portion 120. The flange width is sufficient to retract the cheek and keep it away from the teeth in the posterior mouth section. There are a plurality of holes 124 on the superior and tooth-approximating surfaces of the tube portion 120 for withdrawal of fluid in the buccal area.

Referring to Figs. 9–13, an upper molar suction and retractor support 126 is telescopically carried in the end portion of tube portion 120. This support comprises a tube 128 slidably carried within the end portion of tube portion 120.

The outer end of the tube 128 has an enlarged head portion 130 with a forwardly slanting hole 132 which connects with the opening in the tube 128. An L-shaped locking arm 134 is secured to the head portion and extends rearwardly therefrom so that the long side is spaced from and generally parallel to the tube 128. The end 135 of the locking arm 134 is adapted to selectively be positioned in one of the locking grooves 136 on the tube portion 120 as indicated in Figs. 10 and 11 to fix the position of the upper molar suction and retractor support 126 with respect to the tube portion 120.

The lingual suction and retracting arm 114 comprises a forwardly directed inverted U-shaped tube portion 138 extending from the outer end of tube 112. A tube portion 140 extends from tube portion 138 generally in alignment with the horizontal portion of tube 112. This tube portion 140 has a plurality of holes 142 for withdrawing the fluid from the lingual cavity. A flange-like tongue retractor 144 is secured to and extends outwardly from the tube portions 138 and 140. As shown in Fig. 10 the retractor 144 commences low on the downward and lingual leg of the tube portion 138 and extends throughout the length of the tube portion 140.

The lower posterior aspitractor unit 110 is held in position by the holder 20 in the same manner as the lower anterior aspitractor unit 22. The lower posterior unit 110 is positioned so that the buccal suction and retractor arm 116 fits down between the lower teeth and the inner side of the cheek with the end being positioned adjacent the third molar. The lingual suction and retractor arm 114 is positioned within the lingual cavity adjacent the teeth in general horizontal alignment with the buccal arm 116.

Obviously, the lower posterior aspitractor unit must be made in right and left hand models while the lower anterior aspitractor unit is needed in only one embodiment.

Figure 13:
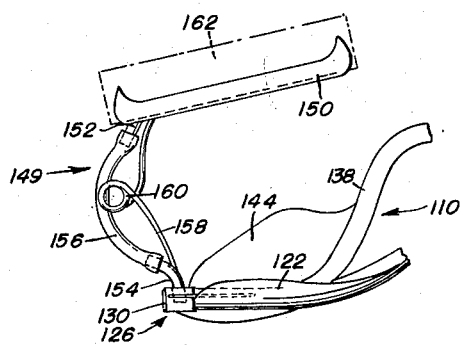
Fig. 13 is a side elevational view showing the upper molar suction and retractor unit secured to the upper molar suction and retractor unit support slidably carried in the lower posterior aspitractor unit.

In the event that work is to be done on the upper posterior teeth an attachment is provided for use in conjunction with the lower posterior aspitractor unit. This attachment has been denoted as an upper molar suction and retractor unit 149 and as illustrated in Fig. 13 comprises a concave cotton roll holder 150 having a hole at one end. A short tube 152 extends from this hole and by means of flexible tube 154 is connected to a short tube 156. The two short tubes are held in spaced relation by a spring 158 which is secured to each short tube. The spring 158 has a coil section 160 intermediate its ends so as to allow for movement between the short tubes upon the application of moderate force. A cotton roll 162 shown in dotted lines is positioned in the cotton roll holder as indicated in Fig. 13. The upper molar suction and retractor unit 149 is secured to the upper molar suction and retractor support 126 by introducing tube 156 into hole 132 so that the unit 149 will assume the position indicated in Fig. 13. By so doing, continuous suction is provided from the cotton roll holder 150 through tube 152, flexible tube 156, tube 154, telescoping tube 128, tubular portions 120 and 118 and primary suction tube 112.

It is believed that the use and function of the aforedescribed apparatus is clear from this description, however, a brief summary follows.

When working on the lower anterior teeth, the holder 20 and the lower anterior aspitractor unit 22 are employed. The holder is fitted to the patient by properly adjusting and fitting the chin rest 40. The lower anterior aspitractor is introduced in the mouth by a slight rotary motion placing it in desired position and properly adjusting its position. The holder 20 is then brought into position placing the chin rest underneath the patient's chin and jaws. The primary suction tube 82 of the lower anterior unit is placed in slot 70 of the holder 20 and lock member 72 is actuated by lever 78 thus locking the aspitractor securely in the holder. The position of the chin rest 40 may be changed by slidably adjusting yoke arm portions 33 carried in flange 28 so as to vary the height of the chin rest with respect to the holder. If it seems desirable to position the plate 26 and flange 28 to the right or left this may be accomplished by pressing button 54 on the holder 20 thereby causing pin 48 to be withdrawn from hole 46 in plate 26 thus allowing plate 26 to pivot about pin 27 so that it may be aligned with one of the other holes 46 and again be locked in position by pin 48.

With the holder and lower aspitractor properly adjusted to the patient the cotton roll holder and tongue retractor will fit down just behind the lower anterior teeth. Thus the curved portion 90 of each side of the suction tube 84 will fit over the lower anterior teeth and the curved portion 88 will fit down between the adjacent buccal and labial surfaces of the mouth. Suction on tube 82 will withdraw fluid from the lingual area through the open ends of tube portions 80 which are in contact with the cotton roll carried by the holder 94. Fluid from the buccal and labial surfaces is withdrawn through a plurality of holes 102 and 104 in the suction tubes 84. The tongue is held in retracted position by plate 94.

In working on the lower posterior teeth, the holder is adjusted as before described and the lower posterior aspitractor unit 110 placed with the tube 112 in the holder slot 70. The buccal suction and retracting arm 116 is positioned down between the cheek and the patient's lower posterior teeth so that the flange 122 will retract the cheek. The lingual suction and retractor arm 114 extends down over the lower teeth so that the arm fits in the lingual cavity adjacent the lower posterior teeth. The flange 144 acts to retract the tongue while holes 142 afford openings for withdrawal of lingual fluids. The telescopically carried upper molar suction and retractor support 126 may be extended forwardly alongside the posterior teeth when fluid withdrawal is needed further back in the area between the teeth and cheek.

When working on the upper molar teeth, the upper molar suction and retractor 149, Fig. 13, is attached to the support 126 so that the cotton roll holder 150 is positioned between the cheek and the upper molar teeth. Fluid is withdrawn through the cotton roll, tube 152, flexible tube 156, tube 154, telescoping tube 128 and suction and retractor arm 116.

Having thus described my invention, what I claim as novel and desire to secure by Letters Patent of the United States is:

1. A dental device for removing saliva from the oral cavity and retracting the tongue, cheek and lip, singly or in combination, said device comprising a holder body, support means carried by the body, a chin and jaw rest secured to said support means, a transverse slot in the upper portion of the body, a primary suction tube held in the transverse slot, means on the body to retain the primary suction tube in position within the slot, suction and retraction means extending from the end of the primary tube adjacent the chin and jaw rest, said suction and retraction means being adapted to fit within the lingual cavity adjacent the lower teeth to retract the tongue and withdraw fluid from said cavity, and also adapted to fit down between the lower teeth and the inner surface of the mouth adjacent thereto to retract said surface and to remove fluid from the area between the lower teeth and the inner surface of the mouth.

2. A dental device for removing saliva from the oral cavity and retracting the tongue, cheek and lip, singly or in combination, said device comprising a holder body, a plate pivotally secured to the mid-portion of the body, a support secured to the upper end of the plate, a chin and jaw rest carried by the support, said holder body having a transverse slot above the pivot point of the plate, a primary suction tube held in the transverse slot, means on the body to retain the primary suction tube in position within the slot, the tube being bifurcated at the end adjacent the jaw and chin support, suction and retraction means extending respectively from the bifurcation, said means being adapted to fit within the lingual cavity adjacent the lower teeth to retract the tongue and withdraw fluid from said cavity, and also adapted to fit down between the lower teeth and the inner surface of the mouth adjacent thereto to retract said surface and to remove fluids from the area between the lower teeth and the inner surface of the mouth.

3. The device as described in claim 2 and including an upper suction and retracting means extending upwardly from the suction and retraction means that fit down between the lower teeth and the inner surface of the mouth adjacent thereto.

4. A dental device for removing saliva from the oral cavity and retracting the tongue, cheek and lip, singly or in combination, comprising a holder body, a plate pivotally secured to the mid-portion of the body, a yoke support secured to the upper end of the plate, means for adjusting the position of the yoke support with respect to the holder body, a chin and jaw rest mounted on the yoke support, the body having a transverse slot above the pivot point of the plate, a primary suction tube held in the transverse slot, means on the body to retain the primary suction tube in position within the slot, said tube being bifurcated at the end adjacent the jaw and chin rest, a lingual suction tube extending from one side of the bifurcation, said tube having a forwardly directed inverted U-shaped portion adapted to pass over and down behind the lower anterior teeth, a tube portion projecting beyond the U-shaped portion, said tube portion having at least one aperture therein, a flange extending laterally outward from said tube portion and adapted to retract the tongue, a buccal suction tube extending from the other side of the aforesaid bifurcation, said buccal suction tube curving laterally outward and then followed by a portion turning forwardly so as to be adapted to fit down adjacent the lower posterior teeth, said forwardly directed portion having at least one aperture, a flange extending outwardly from said forwardly directed portion, said flange being adapted to retract the buccal surfaces adjacent thereto.

5. The device as described in claim 4 and wherein an upper molar suction and retractor unit is telescopically mounted in the end portion of the buccal suction tube.

6. The device as described in claim 5 and including means for retaining the upper molar suction and retractor unit in position with respect to the end portion of the buccal suction tube.

7. The device as described in claim 6 wherein the upper molar suction and retractor unit comprises a tube telescopically carried in the end portion of the buccal suction tube, a head closing the free end of said tube, said head having a hole connecting with the tube, a spring support extending upwardly from the head, a cotton roll support carried by the upper end of the spring support, said cotton roll support having a hole therein, a flexible hose connecting the cotton roll support hole with that in the head so that fluid may be withdrawn from a cotton roll carried in the support.

8. A dental device for removing saliva from the oral cavity and retracting the tongue, cheek and lip, singly or in combination, comprising a holder body, a plate pivotally secured to the mid-portion of the body, a support secured to the upper end of the plate, means for adjusting the position of the support with respect to the holder body, a chin and jaw rest mounted on the support, said body having a transverse slot above the pivot point of the plate, a primary suction tube held in the transverse slot, means on the body to retain the primary suction tube in position within the slot, said tube being bifurcated at the end adjacent the jaw and chin rest, a pair of suction tubes extending laterally outward from the bifurcation, with at least one aperture in the said extending portion of each tube, each tube of the pair then turning to form a downwardly extending and forwardly directed U-shaped portion, and having at least one aperture therein, each tube then turning inwardly toward the other to form a generally inverted U-shaped portion adapted to fit over the lower anterior teeth and terminating in spaced relation in a position generally level with the primary suction tube, and a cotton roll holder and tongue retractor secured to the ends of the pair of suction tubes.

9. The device as described in claim 8 wherein the cotton roll holder and tongue retractor comprises a plate apertured at the two points where the two suction tubes are secured to the plate, the forward portion of the plate being curved upwardly to act as a tongue retractor.

10. A holder for use in conjunction with a dental device for saliva removing and tongue, cheek and lip retracting, each device having a tubular portion by which it is held in the holder, said holder comprising a body, a plate pivotally mounted on said body, support means adjustably carried by the plate, a chin and jaw rest carried by said support means, and tube securing means on said body for engaging and holding the saliva removing and tongue, cheek and lip retracting device by its tubular portion.

11. A holder for use in conjunction with a dental device for removing saliva from the oral cavity and retracting the tongue, cheek and lip, singly or in combination, each device having a tubular portion by which it is held in the holder, said holder comprising a holder body, a plate pivotally secured to the mid-portion of the body, a yoke support secured to the upper end of the plate, means for adjusting the position of the yoke support with respect to the holder body, a chin and jaw rest mounted on the yoke support, said holder body having a transverse slot above the pivot point of the plate adapted to receive the tubular portion of the dental device and retaining means for securing the tubular portion of said slot.

References Cited in the file of this patent
UNITED STATES PATENTS
2,459,273    Freedland _____ Jan. 18, 1949